Patented June 2, 1936

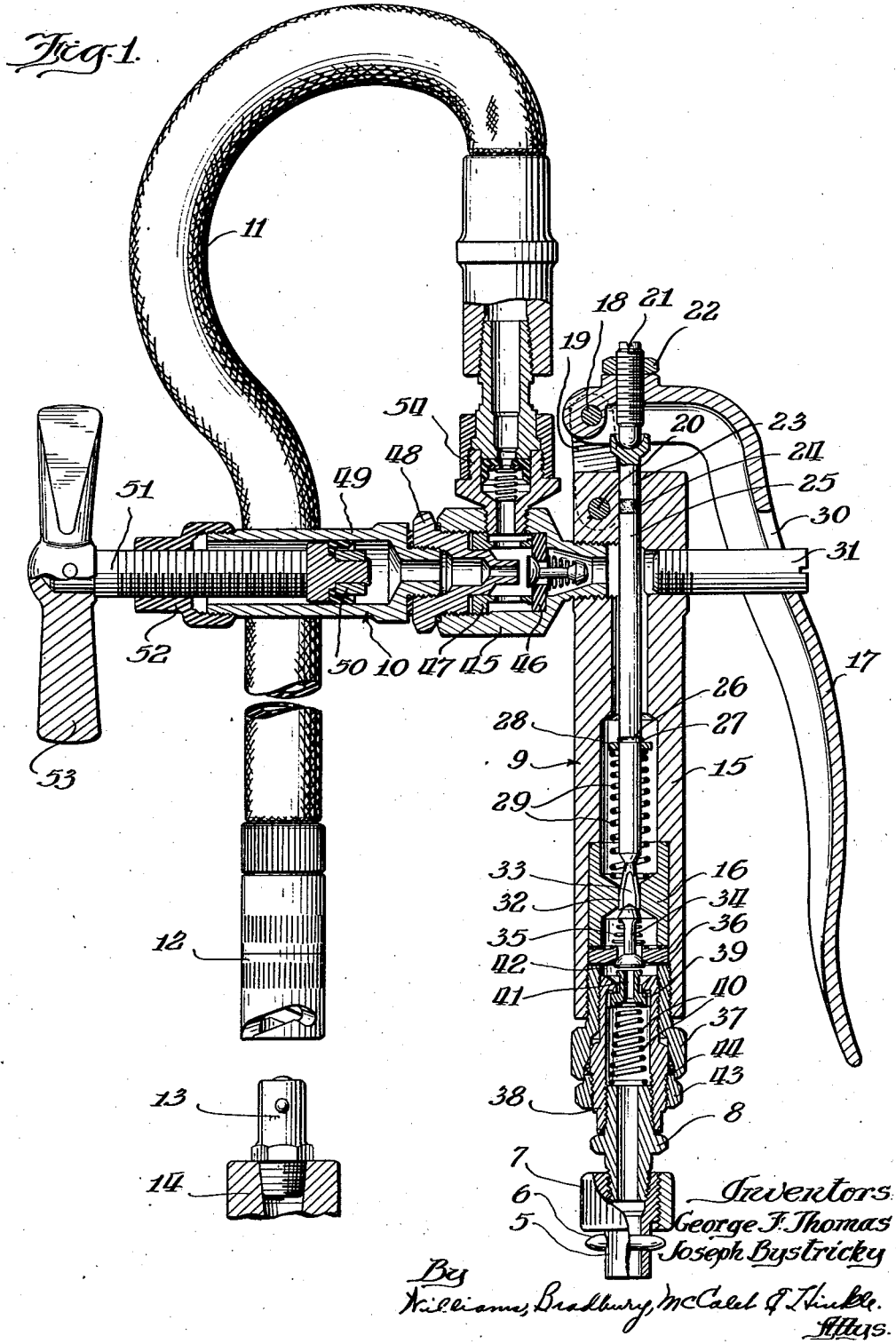

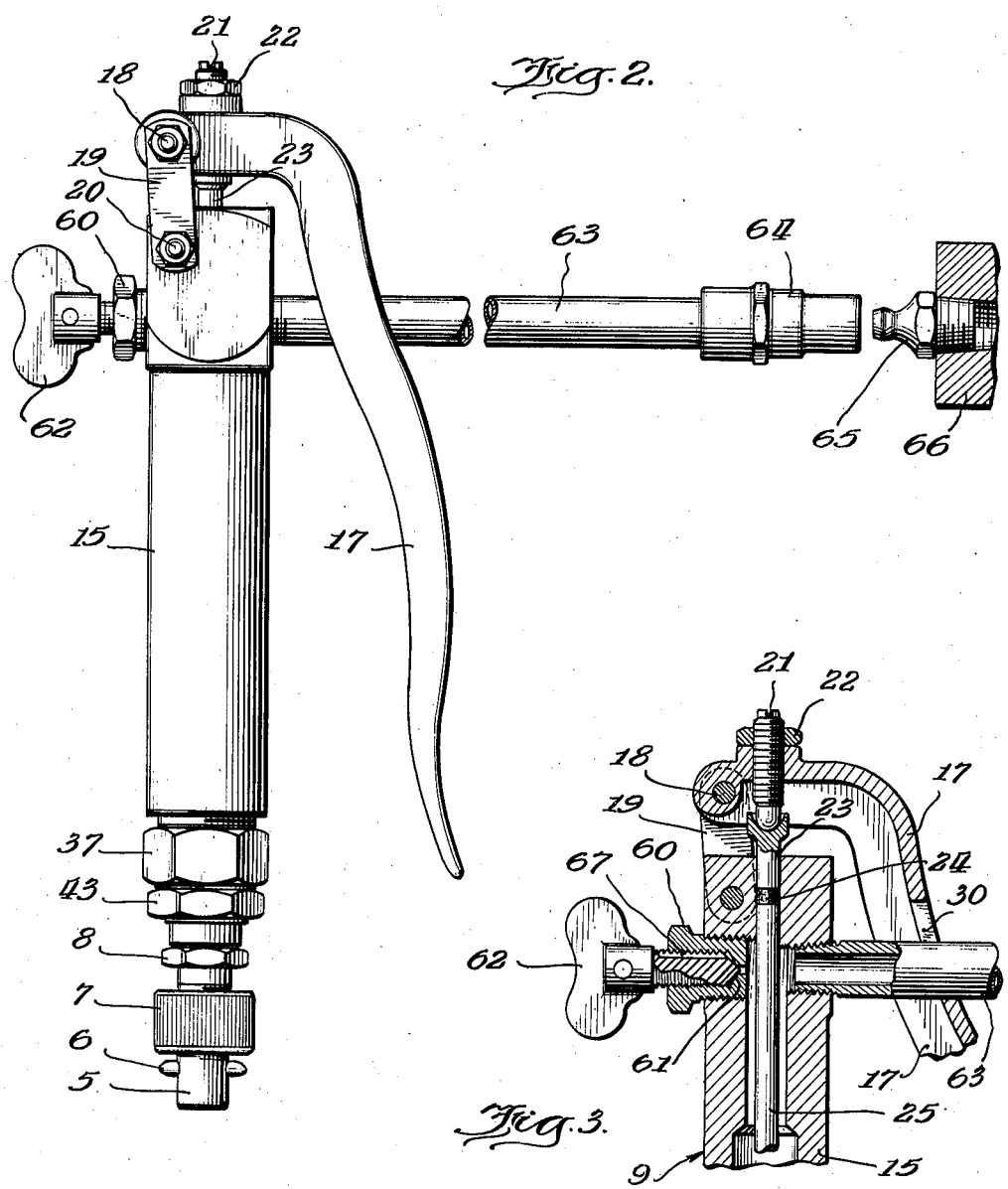

2,042,970

UNITED STATES PATENT OFFICE 2,042,970

LUBRICATING APPARATUS

George F. Thomas, Riverside, and Joseph Bystricky, Chicago, Ill., assignors, by mesne assignments, to Stewart-Warner Corporation, Chicago, Ill., a corporation of Virginia Application June 23, 1933, Serial No. 677,242

14 Claims. (Cl. 221—47.3)

Our invention pertains to lubricating apparatus and is more particularly concerned with mechanism for controlling the discharge of lubricant from the power-operated lubricant compressors commonly used in service stations and garages for lubricating the chassis bearings of automobiles.

Most of the chassis bearings of automobiles require only small quantities of lubricant, whereas a few of the chassis parts which require lubricant, such, for example, as the steering gear mechanism, are located in housings which require large and indeterminate quantities of lubricant. The small quantities of lubricant required by most of the chassis bearings vary somewhat with the size of the automobile, and in general it may be said that the bearings of the smaller automobiles require smaller quantities or shots than do the bearings of the larger automobiles.

An object of our invention is to provide control mechanism for power-operated lubricant compressors which will permit the operator to supply shots of predetermined quantities to those chassis bearings requiring only small amounts of lubricant and a continuous flow of lubricant with which to fill housings containing other parts requiring lubrication.

Another object is to provide control mechanism which may be quickly adjusted to give shots of lubricant of different sizes.

Another object is to provide control mechanism which may be easily operated even when the lubricant discharged by the lubricant compressor is supplied to the bearings under extremely high pressure.

Another object is to provide control mechanism which may easily be adapted to lubricate the chassis bearings of automobiles through the different types of fittings now supplied as standard factory equipment.

Another object is to provide control mechanism having inlet and outlet valves of identical construction, thereby simplifying the servicing and repair of this mechanism.

Another object is to provide control mechanism which may be readily disassembled to remove dirt or other obstructions from the valve mechanisms.

Another object is to provide control mechanism wherein the valves form sub-assemblies which may be easily and quickly removed and replaced.

Another object is to provide control mechanism which is simple and economical to manufacture and which is durable, efficient and easily operated.

Another object is to provide control mechanism having an improved sealing means.

Other objects and advantages will become apparent as the description proceeds.

In the drawings, Figure 1 is a view, partly in section, showing one form of our invention;

Figure 2 is an elevation showing an adaptation of our invention for lubricating the chassis bearings of automobiles through a different type of lubricant fitting; and Figure 3 is a sectional elevation of part of the structure shown in Figure 2.

Referring to Figure 1, we have illustrated our invention as provided with a coupling member 5 having a cross-pin 6 with projecting ends adapted to be engaged in the slots of the bayonet coupler commonly attached to the end of the flexible discharge hose of the type of power-operated lubricant compressors now in common use in garages and service stations for lubricating the chassis bearings of automobiles. The lock-nut 7 may be screwed against the end of the bayonet coupler to securely lock the bayonet coupler and coupling member 5 together.

The coupling member 5 is attached to the end of a pipe nipple 8 leading to a release valve generally designated by reference numeral 9. A booster, indicated generally by reference numeral 10, is associated with and receives the lubricant passing through the release valve 9, and this booster in turn is connected to a flexible discharge conduit 11 having a bayonet slotted coupler 12 adapted for making quick detachable connections with the pin fittings 13 permanently attached to the chassis bearings of the automobile, one of which is indicated at 14.

The release valve comprises a body 15 having an opening therethrough which is enlarged at one end to receive a guide 16. An operating lever 17 is pivoted at 18 to a pair of links 19 which in turn are pivoted to opposite sides of the upper end of the body 15, as indicated at 20. The operating lever 17 carries an adjustable screw 21 which may be locked in any adjusted position by lock-nut 22. The lower end of screw 21 has a rounded end which is received in the cup-shaped depression formed in the upper end of a short rod 23 which is reciprocably mounted in the upper end of the body 15.

A disk 24, of leather or other suitable sealing material, is located between the lower end of the rod 23 and the upper end of the valve actuating pin 25. The pin 25 is made of small diameter approximating three-sixteenths of an inch, and has a groove 26 for receiving a C-shaped spring 27 which forms a shoulder for washer 28. The washer 28 receives the thrust of a spring 29 which rests against a shoulder provided by the guide 16.

The spring 29 normally maintains the pin 25 and rod 23 in upper position and holds the operating lever 17 away from the body 15. Operating lever 17 has a slot 30 in which is located a stud 31 screwed into an opening provided in the upper end of the body 15. Outward movement of the operating lever 17 is limited by engagement between the lower extremity of the slot 30 and the stud 31.

The lower end of pin 25 is enlarged, as indicated at 32, to fit snugly in the central restriction provided by guide 16. The enlarged portion 32 is provided with flats 33 which permit passage of lubricant past the enlarged portion 32 and the cylindrical bore of the guide 16.

The lower portion 32 of the pin 25 is located immediately over the upwardly projecting stem of a valve member 34. The valve member 34 has a semispherical seating surface which is held by spring 35 in engagement with the annular edge provided by valve seat member 36. Suitable gaskets, of leather, cork, or similar material, are located on opposite sides of the valve seat 36, and this valve seat and these gaskets are clamped in place between the lower end of guide 16 and the upper end of a sleeve 37 which is screwed into the lower end of the body 15.

The valve member 34, spring 35 and valve seat 36 form a sub-assembly which may be quickly and easily removed by simply unscrewing sleeve 37 from the end of body 15. When thus removed, this valve assembly may be quickly cleansed of any dirt which interferes with the seating of the valve, or the complete valve assembly will be replaced by a new one if the valve and its seat have worn to such an extent as to require such replacement.

A second sleeve 38 is threadedly engaged with the sleeve 37. The upper end of sleeve 38 is conformed to provide a valve seat for a valve member 39. The valve member 39 is normally held against its seat by a relatively strong spring 40 which rests on the upper end of the pipe nipple 8. The valve member 39 has a small bore 41 which provides limited flow past this valve even when the valve member is in normal position in engagement with its seat.

A chamber 42 is provided between the upper end of the sleeve 38 and the valve seat 36. The size of this chamber controls the amount of lubricant discharged in each shot, and this size can be varied by screwing the sleeve 38 inwardly or outwardly with respect to the sleeve 37. The lower end of the sleeve 38 and the lower end of the sleeve 37 are provided with flat or wrench-engaging portions to facilitate such adjustment. After the adjustment has been made, a lock-nut 43 is screwed tightly against the end of the sleeve 37 to firmly lock the sleeves 37 and 38 in adjusted position. A sealing gasket 44 is provided to prevent leakage.

In this form of our invention a pipe fitting 45 is screwed into a laterally extending opening provided in the upper end of the body 15. This fitting 45 provides a shoulder against which a valve assembly 46 is held by a valve-retaining member 47 threadedly engaged with the fitting 45. The valve assembly 46 is identical with the valve assembly comprising the valve member 34, spring 35 and valve seat 36, and, if desired, the two valve assemblies may be interchanged.

A nipple 48 connects one end of a booster cylinder 49 with the pipe fitting 45, suitable gaskets being interposed to prevent leakage. A piston 50 is located in the cylinder 49 and is advanced by a stem 51 which threadedly engages cap 52 secured to the end of the cylinder 49. The stem 51 is provided with a handle 53 by means of which the stem may be manually rotated to advance the piston 50. A swivel 54 of conventional construction connects the flexible discharge conduit 11 with the pipe fitting 45.

The operation of this form of our invention is as follows:

Assuming that the coupling member 5 is connected to the flexible discharge conduit of a power-operated compressor of the type which maintains the lubricant in the discharge conduit under the maximum pressure which the compressor is capable of developing, the operator first connects the bayonet coupler 12 to the pin fitting 13. If the bearing is one which requires only a small quantity of lubricant, the operator presses the lever 17 toward the body 15, thereby moving pin 25 downwardly and opening valve member 34. The lever 17 is moved toward the body 15 until the valve member 34 engages and seals against the upper end of valve member 39. Because of the strength of spring 40 and the resistance to downward movement of the valve member 39, the operator is immediately apprized of the fact that the valve member 34 has engaged the upper end of valve member 39.

During this movement lubricant is displaced from the chamber 42 past the valve member 34 due to the inward movement of the valve member and also to a slight extent to flow of lubricant into this chamber 42 through the restricted bore 41 in valve member 39. The operator then releases lever 17 which permits spring 29 to return the lever 17, rod 23 and pin 25 to their original positions. At the same time spring 35 returns valve member 34 to closed position.

During this return movement, there will be a slight additional discharge of lubricant due to flow through bore 41 as the valve member 34 moves between the upper end of valve member 39 and valve seat 36. The lower end of valve member 34 and the upper end of valve member 39 are so formed that a seal is effected while these parts are held in engagement.

The total amount of lubricant discharged in the foregoing operation is what we refer to as a shot, and if the sleeves 37 and 38 are properly adjusted this shot provides sufficient lubricant to lubricate most of the chassis bearings of an automobile. When it is desired to fill a housing or otherwise to provide more lubricant, the lever 17 is moved closer toward the body 15, thereby depressing valve member 39 and permitting a continuous flow of lubricant past valve members 34 and 39 as long as the lever 17 is held in this position. When sufficient lubricant has been supplied to the housing or other part, the lever 17 is released, whereupon valve members 34 and 39 are reseated and the flow of lubricant ceases.

Because of the small diameter of pin 25 and valve member 34, little strength is required to operate the lever 17 either to provide a shot or for continous flow, even where the lubricant compressor is capable of developing high pressures. The seal effected by the leather disk 24 compressed between the ends of the rod 23 and pin 25, maintains an effective seal under high pressure even where the parts are made of small diameter.

The booster 10 is only used on those comparatively rare occasions where the bearing is so badly clogged or frozen that the pressure developed by the lubricant compressor is insufficient to force fresh lubricant thereinto. The check valve assembly 46 prevents the lubricant pressure created in the booster from reaching the lubricant compressor.

In that form of our invention shown in Figures 2 and 3, the pipe fitting 45, booster 10, and discharge conduit 11, of Figure 1, are omitted, and in lieu of the pipe fitting 45 a tubular nut 60 is screwed into the lateral bore in the upper end of the body 15. This nut has a shoulder 61 forming a valve seat which is normally closed by the tapered end of a wing nut 62.

In this form of our invention the stud 31 has also been replaced by a rigid metal pipe 63 carrying a coupling member 64 for engagement with a nipple or fitting 65 attached to a bearing 66. The coupling member 64 and fitting 65 are indicated as being of the type claimed in the application of Joseph Bystricky, Serial No. 661,713, filed March 20, 1933. As an alternative, these parts may be made in conformity with Zerk Patent No. 1,475,980, since equipment corresponding to this Zerk patent is also standard automotive equipment.

The wing nut 62 has a groove 67 whereby uncoupling of the coupling member 64 from the fitting 65 may be facilitated by relieving the pressure in the upper part of the body 15 and the pipe 63 by unscrewing the wing nut 62 a part of a turn.

The operation of that form of our invention shown in Figures 2 and 3 is generally similar to the operation of the form shown in Figure 1, so that no further description of the mode of operation of the form of our invention shown in Figures 2 and 3 is deemed necessary.

It is to be understood that we have illustrated but two of the various and numerous forms which our invention may take, and that the scope of our invention is limited solely by the following claims.

We claim:

1. In lubricating apparatus of the class described, control mechanism comprising a measuring chamber having an inlet and an outlet, a discharge conduit communicating with said outlet, a valve normally closed to cut off communication between said chamber and said discharge conduit, a supply conduit communicating with said inlet, a normally closed valve at said inlet, said valve having a restricted opening therein to provide limited communication between said supply conduit and said measuring chamber and being openable to provide free communication between said supply conduit and said measuring chamber, and manual means for selectively opening one or both of said valves.

2. In lubricating apparatus of the class described, control mechanism comprising a pair of normally closed valves having a measuring chamber therebetween, a discharge conduit connected with one of said valves and said chamber, and being normally cut off from said chamber by said valve, a supply conduit connected with the other of said valves and said chamber, said other valve having a restricted opening therethrough permitting limited communication between said supply conduit and said chamber and being openable to provide free communication therebetween, means for adjusting the capacity of said chamber, and means for selectively opening one or both of said valves.

3. In mechanism of the class described, control means comprising a pair of valves having a measuring chamber therebetween, supply and discharge conduits connected to said valves and said chamber, one of said valves being normally closed to cut off communication between said chamber and said discharge conduit, the other valve being normally closed to prevent free communication between said chamber and said supply conduit, there being restricted communication between said measuring chamber and said supply conduit, and manual means for selectively opening one or both of said valves.

4. In lubricating apparatus of the class described, control means comprising a pair of normally closed valves having a measuring chamber therebetween, supply and discharge conduits connected with said valves and said chamber, one of said valves having a restricted passageway therepast and being located between said measuring chamber and said supply conduit, and means for selectively opening one or both of said valves.

5. In lubricating apparatus of the class described, control means comprising a first valve, a second valve, means normally holding said valves in closed position, there being a measuring chamber located between said valves, said second valve having a restricted passageway therepast, a supply conduit connected with said second valve and said chamber, a discharge conduit connected with said first valve and said chamber, and means for opening said first valve and for moving it to a position to close the passageway past said second valve whereby lubricant from said chamber may flow into said discharge conduit.

6. In lubricating apparatus of the class described, control mechanism comprising a pair of valves having a measuring chamber therebetween, one of said valves having a restricted opening therethrough, a spring for each valve, the spring for said valve having the restricted opening being stronger than the spring for said other valve, a supply conduit communicating with said measuring chamber past said valve having the restricted opening, a discharge conduit communicating with said measuring chamber past the other valve, and manual means for selectively opening one or both of said valves.

7. In lubricating apparatus of the class described, control means comprising a pair of valves having a measuring chamber therebetween, a spring for each valve, one of said springs being materially stronger than the other, the valve with the stronger spring having a normally open passageway therepast, a supply conduit communicating with said chamber through said last-named valve, a discharge conduit communicating with said chamber past said other valve, and means for opening said other valve and positioning it to close said passageway.

8. In lubricating apparatus of the class described, control mechanism providing a measuring chamber having a restricted inlet, means for supplying lubricant under pressure to said inlet, said chamber having an outlet, a spring pressed valve including a member normally closing said outlet, and means movable with respect to said valve for opening said valve and moving said member to a position to close said inlet.

9. Control apparatus for hydraulic mechanism, comprising a body a handle carried by said body and movable relative thereto from a position of rest to either one of two operating positions, a valve actuated by a short movement of said handle to one of said operating positions to supply a predetermined quantity of a fluid-like substance, and means including said valve and a second valve operated upon a longer movement of said handle to a second operating position to provide a continuous discharge of a fluid-like substance.

10. In control apparatus of the class described, the combination of a body member providing a chamber, a unitary inlet valve assembly located at said chamber, means for supplying a fluid-like substance under pressure to said valve assembly, manual means for opening said valve against said pressure, a discharge conduit, a booster mechanism connecting the chamber in said body member with said discharge conduit, and a unitary valve assembly interposed between said chamber and said booster mechanism, said valve assemblies being removable, identical, and interchangeable.

11. In control mechanism of the class described, the combination of a body member having a passageway extending therethrough, a first valve assembly removably mounted in said body to control the flow therethrough, a second valve assembly in said passageway adjacent said first-mentioned valve assembly, means for supplying a fluid-like substance under pressure to said last-mentioned valve assembly, manual means for opening said valves in succession to permit flow of the substance therepast, and an outlet valve assembly removably associated with said body member, said last-named valve assembly being interchangeable with said first-mentioned valve assembly.

12. In control mechanism of the class described, the combination of a body member having a passageway therethrough, a pair of valves normally closing the inlet to said passageway, one of said valves having a restricted duct extending through it, means for opening said valves in succession, a discharge conduit connected to said body member, a coupling member attached to said discharge conduit and adapted for making a lubricant-tight connection with fittings attached to bearings requiring lubrication, means for supplying lubricant under pressure to said body member and discharge conduit, and valve means mounted in said body member for relieving the pressure therein and in said discharge conduit.

13. In control mechanism of the class described, the combination of a body having a passageway therethrough, one end of said passageway terminating in a bore of small diameter, a guide member located in the opposite end of said passageway, a valve assembly adjacent said guide member, a sleeve for retaining said valve assembly in position, a second sleeve adjustable relatively to said first-named sleeve, valve means associated with said second sleeve, means whereby said second sleeve may be adjusted relatively to said first-named sleeve, means for locking said sleeves in adjusted position, a handle pivotally connected to said body, a pin located in said passageway and having one end located in said small diameter bore and the opposite end located in said guide member, a spring normally urging said pin in one direction, a leather disk located in said small diameter bore, a rod reciprocably mounted in said small diameter bore and contacting with said disk, and an adjustable connection between said rod and said handle.

14. In control mechanism of the class described, the combination of a body having a passageway therethrough, one end of said passageway terminating in a bore of small diameter, a guide member located in the opposite end of said passageway, a valve assembly adjacent said guide member, a sleeve for retaining said valve assembly in position, a second sleeve adjustable relatively to said first-named sleeve, valve means associated with said second sleeve, means whereby said second sleeve may be adjusted relatively to said first-named sleeve, means for locking said sleeves in adjusted position, a handle pivotally connected to said body, a pin located in said passageway and having one end located in said small diameter bore and the opposite end located in said guide member, a spring normally urging said pin in one direction, a leather disk located in said small diameter bore, a rod reciprocably mounted in said small diameter bore and contacting with said disk, an adjustable connection between said rod and said handle, coupling means connected to said second sleeve whereby lubricant under pressure may be supplied to said valve means and passageway, a discharge conduit connected to said passageway, valve means in said discharge conduit, said last-mentioned valve means being identical with said first-mentioned valve means, and coupling means on the end of said discharge conduit.

GEO. F. THOMAS.
JOSEPH BYSTRICKY.